United States Patent
Ding et al.

(10) Patent No.: US 12,189,369 B2
(45) Date of Patent: Jan. 7, 2025

(54) IN-SITU SENSOR-FUSION WITH ARTIFICIAL INTELLIGENCE

(71) Applicant: Lam Research Corporation, Fremont, CA (US)

(72) Inventors: Yu Ding, Lake Oswego, OR (US); Quan Ma, Tigard, OR (US); Gerramine S. Manuguid, Lake Oswego, OR (US); Shantinath Ghongadi, Tigard, OR (US); Robert Marshall Stowell, Wilsonville, OR (US)

(73) Assignee: Lam Research Corporation, Fremont, CA (US)

( * ) Notice: Subject to any disclaimer, the term of this patent is extended or adjusted under 35 U.S.C. 154(b) by 486 days.

(21) Appl. No.: 17/641,352

(22) PCT Filed: Aug. 11, 2020

(86) PCT No.: PCT/US2020/045801
§ 371 (c)(1),
(2) Date: Mar. 8, 2022

(87) PCT Pub. No.: WO2021/050189
PCT Pub. Date: Mar. 18, 2021

(65) Prior Publication Data
US 2022/0342387 A1    Oct. 27, 2022

Related U.S. Application Data

(60) Provisional application No. 62/898,468, filed on Sep. 10, 2019.

(51) Int. Cl.
*G05B 19/416* (2006.01)

(52) U.S. Cl.
CPC .. *G05B 19/416* (2013.01); *G05B 2219/37371* (2013.01)

(58) Field of Classification Search
None
See application file for complete search history.

(56) References Cited

U.S. PATENT DOCUMENTS

| 5,568,882 A | 10/1996 | Takacs |
| 6,171,367 B1 | 1/2001 | Peng et al. |
| (Continued) | | |

FOREIGN PATENT DOCUMENTS

| CN | 1221470 | 6/1999 |
| CN | 101523167 | 9/2009 |
| (Continued) | | |

OTHER PUBLICATIONS

International Application Serial No. PCT/US2020/045801, International Search Report mailed Nov. 25, 2020, 3 pgs.

(Continued)

*Primary Examiner* — Carlos R Ortiz Rodriguez
(74) *Attorney, Agent, or Firm* — Schwegman Lundberg & Woessner, P.A.

(57) ABSTRACT

In one embodiment, the disclosed apparatus is an in-situ, closed-loop bubble and foam detection and reduction system that includes a liquid-level sensor to determine a volume of a liquid in a fluid reservoir, a mass-detection device to determine a mass of the fluid reservoir and any liquid contained within the fluid reservoir, a processor electrically coupled to the liquid-level sensor and the mass-detection device to determine an actual volume of the liquid within the fluid reservoir, and a showerhead coupled to the processor and positioned above the fluid reservoir. The showerhead is activated by the processor when a volume of the liquid determined by the liquid-level sensor exceeds the actual (Continued)

volume of the liquid by a predetermined amount. Other apparatuses and methods are disclosed.

20 Claims, 5 Drawing Sheets

(56) References Cited

U.S. PATENT DOCUMENTS

| | | | |
|---|---|---|---|
| 6,510,736 | B1 | 1/2003 | Van |
| 2005/0126278 | A1 | 6/2005 | Tani et al. |
| 2006/0169579 | A1 | 8/2006 | Hartz et al. |
| 2007/0079804 | A1 | 4/2007 | Nakayama |
| 2008/0079628 | A1 | 4/2008 | Wilkie et al. |
| 2008/0236275 | A1 | 10/2008 | Breed et al. |
| 2010/0024724 | A1 | 2/2010 | Hartz et al. |
| 2014/0001050 | A1 | 1/2014 | Huang et al. |
| 2014/0166476 | A1 | 6/2014 | Abraham et al. |

FOREIGN PATENT DOCUMENTS

| | | |
|---|---|---|
| CN | 102753351 | 10/2012 |
| CN | 104620053 | 5/2015 |
| CN | 114364441 | 4/2022 |
| EP | 3088862 | 11/2016 |
| JP | 2022547950 | 11/2022 |
| KR | 19990021200 | 3/1999 |
| KR | 1019990021200 A | 3/1999 |
| SU | 466380 | 4/1975 |
| WO | 2004109240 | 12/2004 |

OTHER PUBLICATIONS

International Application Serial No. PCT/US2020/045801, Written Opinion mailed Nov. 25, 2020, 4 pgs.

"International Application Serial No. PCT US2020 045801, International Preliminary Report on Patentability mailed Mar. 24, 2022", 6 pgs.

"Chinese Application Serial No. 202080064061.8, Office Action mailed Nov. 9, 2022", w English Translation, 12 pgs.

"Chinese Application Serial No. 202080064061.8, Response filed Mar. 24, 2023 to Office Action mailed Nov. 9, 2022", w English claims, 6 pgs.

IN-SITU SENSOR-FUSION WITH ARTIFICIAL INTELLIGENCE

CLAIM OF PRIORITY

This application is a U.S. National Stage Filing under 35 U.S.C. 371 from International Application No. PCT/US2020/045801, filed on Aug. 11, 2020, and published as WO 2021/050189 A1 on Mar. 18, 2021, which claims the benefit of priority to U.S. Provisional Patent Application Ser. No. 62/898,468, filed on 10 Sep. 2019, and entitled "IN-SITU SENSOR-FUSION WITH ARTIFICIAL INTELLIGENCE," each of which is incorporated by reference herein in its entirety.

TECHNICAL FIELD

The subject matter disclosed herein relates to various types of process-control equipment used in the semiconductor and allied industries. More specifically, the disclosed subject matter relates to sensors used to make a determination whether a chemical or liquid reservoir is about to overflow. The disclosed subject matter further includes a mechanism to reduce a volume of bubbles and foam within the chemical or liquid reservoir.

BACKGROUND

Many processes in the semiconductor and related industries rely on various types of plating and packaging technologies, especially in various types of back-end-of-line (BEOL) operations. The BEOL operations include, for example, various interconnect and other metallization steps performed by various chemical or electrochemical plating steps, known in the art. However, the disclosed subject matter can find numerous applications in the semiconductor and related industries including, for example, flat-panel displays, thin-film heads, and various types of operations where chemical and plating processes are utilized as described in more detail, below.

In various types of chemical processes however, fluid turbulence caused by various flow rates in a chemical delivery system can cause bubbles and/or foam to be formed in chemical reservoirs during processing operations (e.g., on substrates such as, for example, silicon wafers). Contemporaneous types of ultrasonic level-sensors are unable to detect bubbles and/or foam. Therefore, the sensors can trigger a false overflow alarm, thereby dumping all chemicals in the reservoir for safety reasons. In addition to lost production time due to the chemical dumping, the monetary loss in chemical expenses alone can cost $10,000 to $50,000 or more (e.g., in terms of U.S. Dollars (USD)).

Further, readings from ultrasonic level-sensors can be affected by other components in a system that transmit vibration to the sensors to present a false overflow-alarm. The false readings from the sensors are frequently due to insufficient noise isolation between the vibrational system components and the ultrasonic level-sensors. A false overflow-alarm due to noise in a signal generated by the level sensor can abort execution of a process program execution for safety reasons and cause material (e.g., substrate) and chemical waste.

Therefore, in various embodiments described herein, the disclosed subject matter describes apparatuses and systems to detect levels of chemicals within reservoirs properly. Further, additional embodiments disclose devices to reduce or eliminate bubbles and/or foam within the reservoirs.

The information described in this section is provided to offer the skilled artisan a context for the following disclosed subject matter and should not be considered as admitted prior art.

SUMMARY

In an exemplary embodiment, the disclosed subject matter describes a system including a liquid-level sensor for determining a level of a liquid in a fluid reservoir and a mass-detection device for determining a mass of the fluid reservoir and liquid contained therein. A processor, electrically coupled to the liquid-level sensor and the mass-detection device, is for determining a measured volume of liquid as determined by the level of the liquid. The processor also determines an actual volume of the liquid within the fluid reservoir based on a mass of the liquid contained within the fluid reservoir. A showerhead is coupled to the processor and positioned above the fluid reservoir. The showerhead is activated by the processor when the measured volume of liquid determined by the liquid-level sensor exceeds the actual volume of the liquid as determined by the mass-detection device by a predetermined amount. A combination of the liquid-level sensor, the mass-detection device, the processor, and the showerhead thereby comprises an in-situ, closed-loop bubble and foam detection and reduction system.

In an exemplary embodiment, the disclosed subject matter describes a system including a liquid-level sensor for determining a level of a liquid in a fluid reservoir and a mass-detection device for determining a mass of the fluid reservoir and liquid contained within the fluid reservoir. A combination of the liquid-level sensor, the mass-detection device, and the processor thereby comprising an in-situ, closed-loop bubble and foam detection system.

In an exemplary embodiment, the disclosed subject matter describes a system including a liquid-level sensor for determining a level of a liquid in a fluid reservoir and a mass-detection device for determining a mass of the fluid reservoir and liquid contained therein. A processor, electrically coupled to the liquid-level sensor and the mass-detection device, is used to determine an actual volume of the liquid within the fluid reservoir based on a mass of the liquid contained within the fluid reservoir. The processor also determines an anticipated volume of the liquid within the fluid reservoir based on a determined, non-linear regression expectation of volume. A combination of the liquid-level sensor, the mass-detection device, and the processor thereby comprising an in-situ, closed-loop bubble and foam detection system.

DETAILED DESCRIPTION

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. In other instances, well-known process steps, construction techniques, or structures have not been described in detail so as not to obscure the disclosed subject matter.

The disclosed subject matter includes systems, apparatuses, and methods to detect levels of chemicals within reservoirs properly. Further, additional embodiments disclose devices to reduce or eliminate bubbles and/or foam within the reservoirs. Consequently, the disclosed subject matter describes sensors to determine an actual level of chemicals within a reservoir that are less affected by the presence of bubbles or foam that have formed over a surface of the chemicals. Additionally, the disclosed subject matter describes a mechanism to reduce or eliminate bubbles or foam formed over the surface of the chemicals. The bubble and foam reduction mechanism can be used separately or in conjunction with the disclosed sensor mechanisms. For example, as described in more detail below, the disclosed sensor can also be used to control (e.g., turn on or turn off as needed) the bubble and foam reduction mechanism when the sensor is triggered.

Figure 1A:
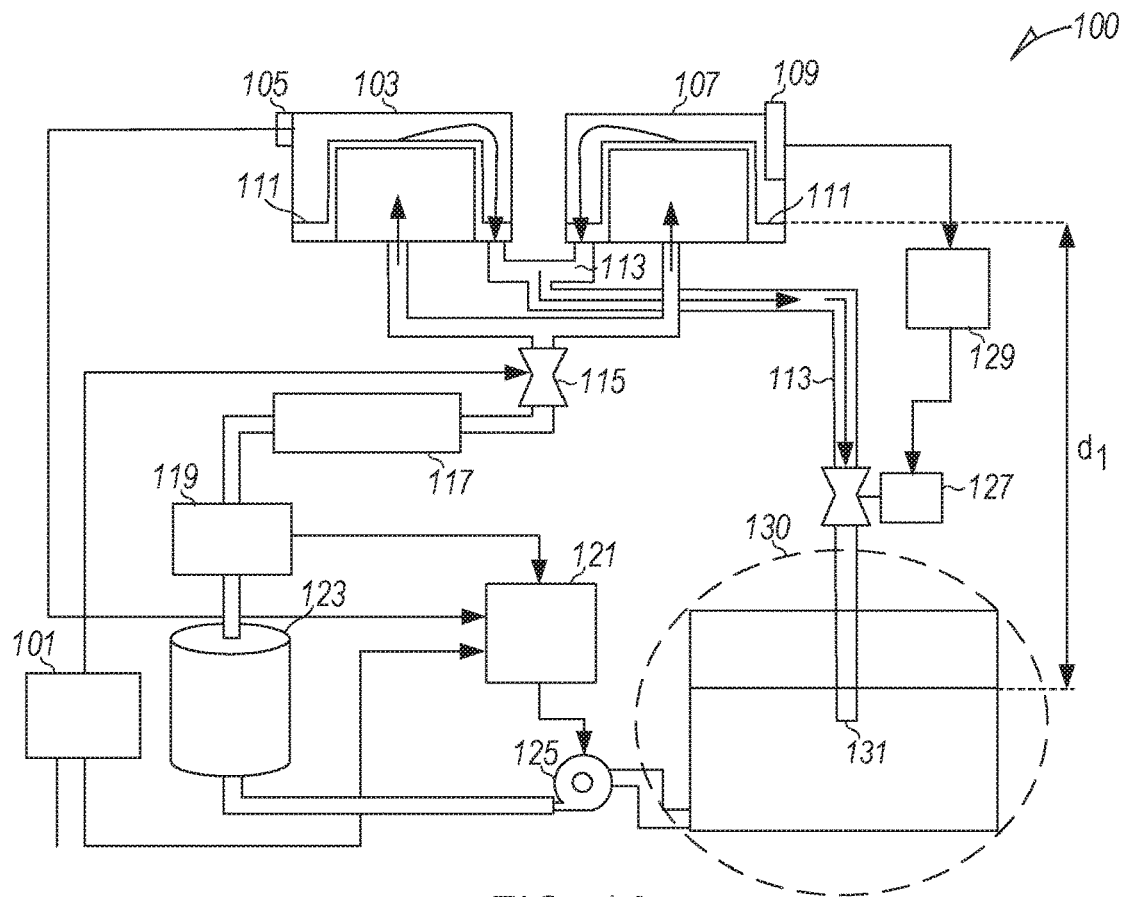
FIG. 1A shows a chemical-reservoir system with level sensors of the prior art.

To appreciate the disclosed subject matter more fully, a person of ordinary skill in the art will appreciate that a better understanding of prior art systems will be informative. For example, FIG. 1A shows a chemical-reservoir system 100 with level sensors of the prior art. The chemical-reservoir system 100 includes a first fountain-type plating cell 103 and a second fountain-type plating cell 107. An overflow sensor 105 and a fluid-level sensor 109 sense liquid-chemical levels in fluid-collection troughs 111 of the first fountain-type plating cell 103 and the second fountain-type plating cell 107, respectively. One or both of the overflow sensor 105 and the fluid-level sensor 109 may comprise an ultrasonic level-sensor, as described above. A common return-line 113 from each of the plating cells 103, 107 directs excess liquid from the fluid-collection troughs 111 to a collection reservoir 130 (described in more detail with reference to FIG. 1B, below). A distance, di, between an uppermost portion of liquid that has overflowed into the fluid-collection troughs 111 may be, for example, about 1.5 meters (approximately 5 feet).

A substrate process-controller 101 controls a cell-feed isolation valve 115 and a flow controller 121. The flow controller 121, in turn, controls a pump 125 to direct and recycle liquid from the collection reservoir 130 through a filter 123 to a flow meter 119, and through a degasser 117. When the cell-feed isolation valve 115 has been opened by the substrate process-controller 101, the recycled, filtered, and degassed liquid continues into the first fountain-type plating cell 103 and the second fountain-type plating cell 107 through a bottom-mounted input valve in each cell. Further, although not shown explicitly, the collection reservoir 130 may also include a liquid sensor similar or identical to one or both or the overflow sensor 105 and the fluid-level sensor 109.

The flow meter 119 and the overflow sensor 105 each provide signals to the flow controller 121 to control a volumetric flowrate of the pump 125. The fluid-level sensor 109 on the second fountain-type plating cell 107 provides a signal to an automated drain-valve control mechanism 127 to open a valve to the common return-line 113 when a level of the fluid-collection troughs 111 is at a predetermined level. The liquid then enters a drain line 131 having an opening located between an air/liquid interface level so as to reduce an amount of bubbles and/or foam formed at an uppermost surface of the collection reservoir 130.

Figure 1B:
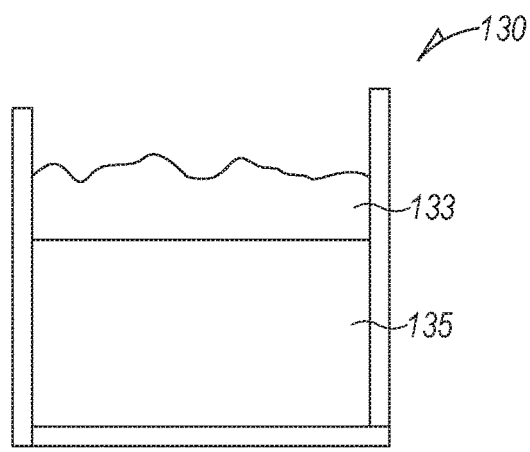
FIG. 1B shows a portion of a chemical-reservoir system of the prior art, such as that shown in FIG. 1A, with bubbles and/or foam.

With reference now to FIG. 1B, a portion of a chemical-reservoir system of the prior art, such as that shown in FIG. 1A, with bubbles and/or foam is shown. FIG. 1B includes the collection reservoir 130 as shown and described above with reference to FIG. 1A. The collection reservoir 130 includes liquid 135 (e.g., a plating solution) as well as at least one of bubbles and foam 133. As described above, a typical ultrasonic level-sensor cannot pass through bubbles or foam down to the level of the liquid 135. Instead, the ultrasonic level-sensor senses an upper portion of a layer formed by the least one of the bubbles and foam 133. As the bubbles or foam raise to a predetermined level within the collection reservoir 130, a signal is sent that falsely triggers an overflow warning, thereby causing unnecessary dumping of the liquid chemical (e.g., the plating solution) from the collection reservoir 130 based on an assumed level of the liquid 135 but caused by the bubbles and/or foam. Although not shown explicitly, a person of ordinary skill in the art will recognize that one or both of the overflow sensor 105 and the fluid-level sensor 109 located on or near the first fountain-type plating cell 103 and the second fountain-type plating cell 107, respectively, may be located on the collection reservoir 130 as well.

Figure 2A:
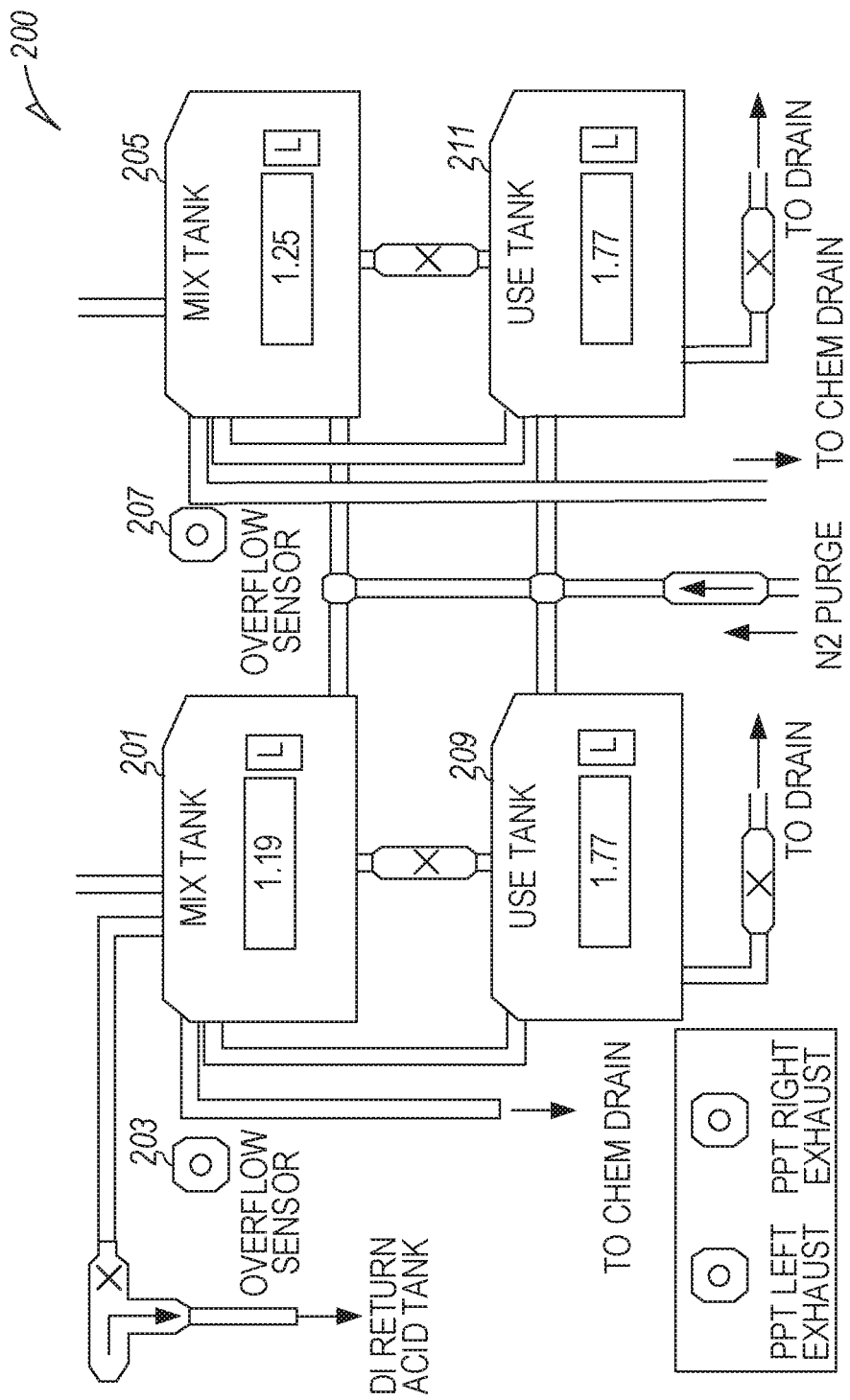
FIG. 2A shows ultrasonic level-sensors in a chemical-reservoir system of the prior art having insufficient noise isolation.

FIG. 2A shows ultrasonic level-sensors in a chemical-reservoir system 200 of the prior art having insufficient noise isolation. The chemical-reservoir system 200 may be used with and may otherwise be similar or identical to at least a portion of the chemical-reservoir system 100 of FIG. 1A. The chemical-reservoir system 200 shows a first mix-tank display 201 and a second mix-tank display 205, each having an associated one or more of a first overflow-sensor 203 and a second overflow-sensor 207, respectively. The chemical-reservoir system 200 further shows a first use-tank display 209 and a second use-tank display 211. Each of the displays 201, 205, 209, 211 is arranged to show a display level in liters, L. However, each of the displays shown in FIG. 2A is an electronic-type of display and, therefore, are potentially susceptible to electronic noise and/or vibrationally-induced false readings from other equipment (e.g., fabrication tools) in the fabrication environment in which the chemical-reservoir system 200 resides.

Figure 2B:
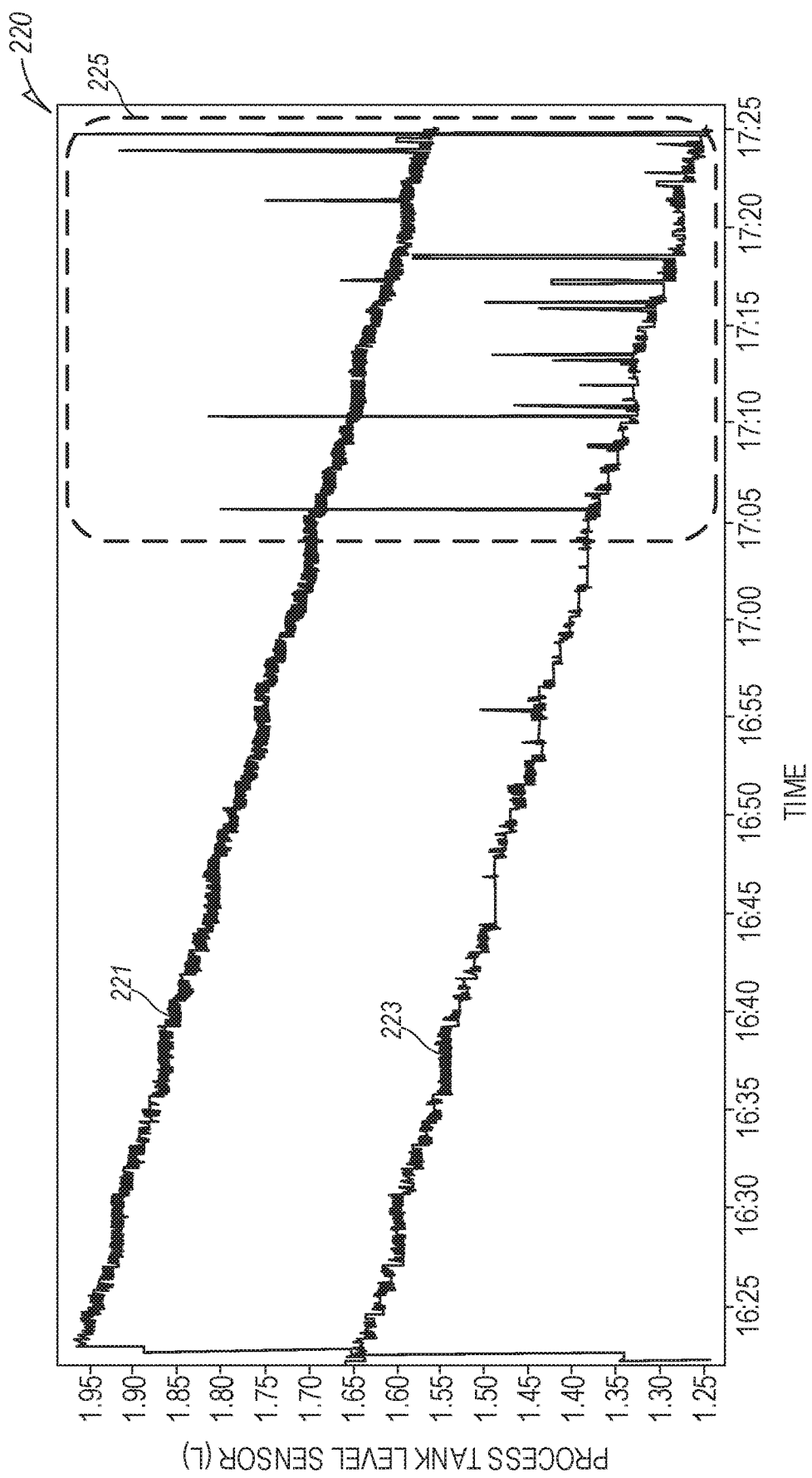
FIG. 2B shows a graph indicating a process-tank level as a function of time for signals received from the ultrasonic level-sensors in the prior art chemical-reservoir system of FIG. 2A.

FIG. 2B shows a graph 220 indicating a process-tank level (in L) as a function of time for signals received from the ultrasonic level-sensors in the chemical-reservoir system 200 of the prior art of FIG. 2A. For example, a first curve 223 displays a level, in L, of the volume of liquid displayed by the first mix-tank display 201, as received from the first overflow-sensor 203. Similarly, a second curve 221 displays a level, in L, of the volume of liquid displayed by the second mix-tank display 205 as received from the second overflow-sensor 207. Shortly after time 17:05 on the graph 220, a portion of the first curve 223 and the second curve 221 each show vibrationally-induced noise spikes within an area 225 of the graph 220. In addition to errors caused by improper readings of any of the sensors (e.g., various ones of the ultrasonic level-sensors described above), the vibrationally-induced noise spikes can cause an erroneous reading of nearly 50% or more. The noise spikes can even be caused by, for example, equipment related to the chemical-reservoir system 200 such as the left and right exhaust devices shown in FIG. 2A. The erroneous readings caused by the vibrationally-induced noise spikes can also falsely trigger an overflow warning, thereby causing unnecessary dumping of the liquid chemical (e.g., the plating solution) from the collection reservoir 130 (see FIG. 1A).

As described, a false overflow-alarm due to bubbles or foam in the chemical reservoir either separate from or combined with a noisy level-sensor reading can cause an unnecessary and expensive chemical dump. The chemical dump can also result in plating defects on one or more substrates located within the fountain-type plating cells 103, 107 at the time of or after the chemical dump. Plating defects on the substrate can relate to hundreds of thousands of dollars, or more, of financial loss due to low or zero yield. Further, unnecessary chemical dumps negatively affect both the cost-of-ownership (COO) of a piece of fabrication equipment (e.g., a process tool) and customer trust regarding the reliability and performance of the tool. As described in detail below, an in-situ sensor, which may be fusion empowered by artificial intelligence, is disclosed for automatic bubble and foam detection and/or removal, and level-sensor noise filtering.

Figure 3:
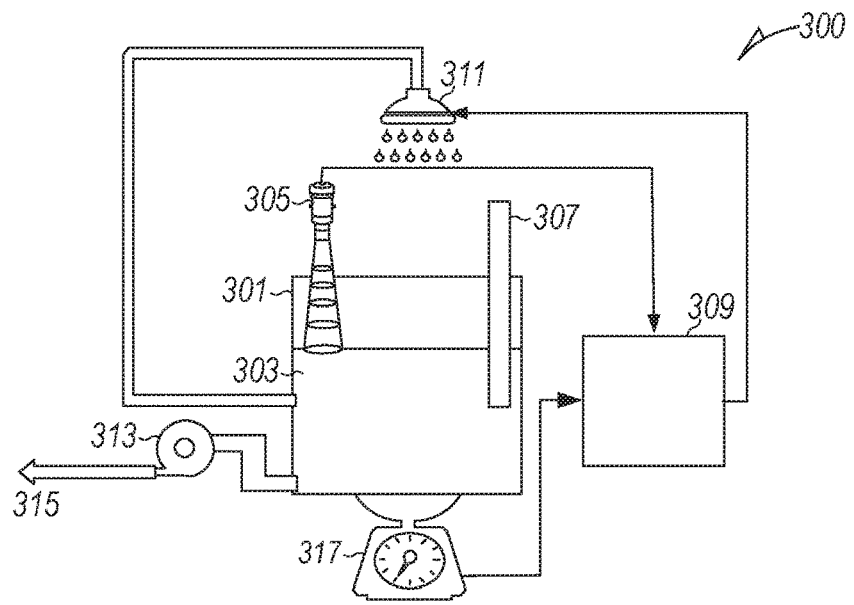
FIG. 3 shows a high-level exemplary embodiment of an in-situ, closed-loop bubble and foam detection and reduction system in accordance with the disclosed subject matter.

With reference now to FIG. 3, an exemplary embodiment of an in-situ, closed-loop bubble and foam detection and reduction system 300 in accordance with the disclosed subject matter is shown. The bubble and foam detection and reduction system 300 is shown to include a foam-reduction showerhead 311, a liquid-level sensor 305, a fluid reservoir 301, a mass-detection device 317, a pump 313, and a flow path 315 coupled to, for example, a plating cell (not shown explicitly but understandable to a person of ordinary skill in the art upon reading and understanding the disclosed subject matter). The fluid reservoir 301 includes a volume of fluid 303 contained therein, as well as a drain tube (e.g., from a plating cell—not shown explicitly).

The liquid-level sensor 305 may comprise an ultrasonic level-sensor or other type of liquid-level sensing device known in the art. The mass-detection device 317 may comprise a digital scale, a spring-loaded scale with an analog or digital-signal output, or any of various types of other pressure-sensing devices including, for example, piezo resistive strain-gauges, capacitive pressure-sensing gauges, electromagnetic pressure-sensing gauges, resonant pressure-sensing gauges, or a host of other types of pressure-sensing gauges known in the art. To prevent or minimize effects of solid tubing affecting mass measurements, all tubing coupled to the fluid reservoir 301 may comprise flexible tubing to reduce or eliminate errors in mass measurements due to structural support of the fluid reservoir 301 caused by solid tubing.

A processor 309 receives signals from both the liquid-level sensor 305 and the mass-detection device 317. Since the density of a given liquid (e.g., a plating solution) is known based on a given operation (e.g., a plating operation), and a mass of the fluid reservoir 301 (when empty) is known, the processor 309 can compare a calculated volume of the fluid 303 within the fluid reservoir 301 based on the known density of the fluid. The calculated volume is then compared to a level of the fluid 303 as reported by the liquid-level sensor 305. If the level of the fluid 303 as reported by the liquid-level sensor 305 indicates a volume of the liquid that is greater than the calculated volume from the mass-detection device 317, then some level of bubbles and/or foam is present within the fluid reservoir 301 (thereby increasing the volume of the liquid by an additional volume due to the bubbles and/or foam that are present). Based on a determination of an actual volume of the fluid 303 within the fluid reservoir 301 and a volume of bubbles and/or foam within the fluid reservoir 301 (as determined from a combination of the received signals from the liquid-level sensor 305 and the mass-detection device 317), the processor 309 may generate and transmit a signal to control (e.g., activate or deactivate) the foam-reduction showerhead 311. The foam-reduction showerhead 311 is coupled to the fluid reservoir 301 (e.g., by a pump, not shown). Liquid sprayed by the foam-reduction showerhead 311 reduces or eliminates the added volume caused by the bubbles and/or foam. After the combination of the received signals from the liquid-level sensor 305 and the mass-detection device 317 indicate a correlated volume within a predetermined tolerance value (e.g., the volume of the fluid 303 as reported by the liquid-level sensor 305 is within about 10% of the calculated volume as determined from mass-detection device 317) the processor 309 sends a signal to deactivate the foam-reduction showerhead 311. Since the foam-reduction showerhead 311 is activated automatically by the processor 309 upon the determination of bubbles and/or foam being present in the fluid reservoir 301, the bubble and foam detection and reduction system of FIG. 3 is considered to comprise a "closed-loop" system.

In various embodiments, the processor 309 may comprise one or more hardware-based controllers, microprocessors, or central processing units (CPUs). In various embodiments, the processor 309 may comprise a special-purpose processor, such as a field programmable gate array (FPGA) or an application-specific integrated circuit (ASIC). In some embodiments, the processor 309 contains an artificial intelligence program, described in detail with reference to FIG. 5.

For example, in various embodiments, the processor 309 may control activation and deactivation of the foam-reduction showerhead 311 based on an actual calculated volume and a reported volume (including an increase in volume due to the bubbles and/or foam) of the fluid 303 within the fluid reservoir 301. In other embodiments, the processor 309 may control activation and deactivation of the foam-reduction showerhead 311 based on an anticipated volume (including the increase in volume due to the bubbles and/or foam) and an actual volume of the fluid 303 within the fluid reservoir 301. A determination of the anticipated volume is described in detail below with reference to an artificial intelligence analysis of FIG. 5.

In still other embodiments, the processor 309 may control activation and deactivation of the foam-reduction showerhead 311 based on a combination of the actual calculated volume and the anticipated volume. In one example of this combination embodiment, either the actual calculated volume or the anticipated volume can be used to trigger activation of the foam-reduction showerhead 311. In another example of this combination embodiment, a predetermined weighting value can be applied the actual calculated volume and the anticipated volume to trigger activation of the foam-reduction showerhead 311. For example, in this latter example, 80% of the weighting can be based on the anticipated volume to trigger activation of the foam-reduction showerhead 311 while the remaining 20% of the weighting is based on the actual calculated volume to trigger activation of the foam-reduction showerhead 311. In this example, the anticipated volume provides the primary trigger activation of the foam-reduction showerhead 311 mechanism while the calculated volume serves as a backup failsafe to the anticipated volume determination scheme.

In still other embodiments, the foam-reduction showerhead 311 may be configured to run continuously during substantially the entirety of a plating cycle. This embodiment may be used, for example, in situations where a particular one or more of the plating chemicals employed may be less sensitive or less delicate (e.g., to effects of being recirculated or insensitive or relatively insensitive to, for example, oxidation effects from constant recirculation) or in a process that is less sensitive to the foam-reduction showerhead 311 running continuously. Rather than using the processor 309, another element, such as software, firmware, or hardware within, for example, a controller of the plating cell, may activate and deactivate the foam-reduction showerhead 311 at the beginning and end of each plating cycle. In still other embodiments, another controller, such as a finite-state machine (FSM), may be configured to activate and deactivate the foam-reduction showerhead 311 at the beginning and end of each plating cycle.

Figure 4:
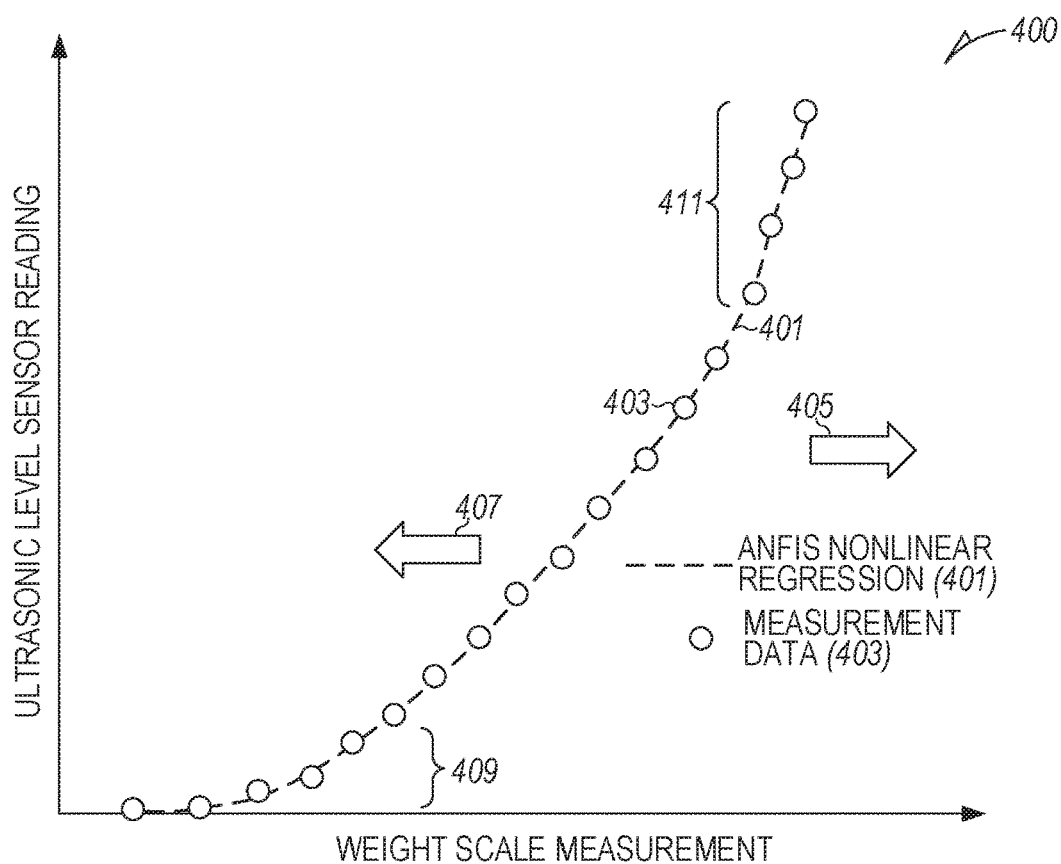
FIG. 4 shows an exemplary embodiment of a graph of ultrasonic level-sensor readings as a function of a weight scale measurement and a comparison with an adaptive, neuro-fuzzy interface system (ANFIS) non-linear regression expectation in accordance with the disclosed subject matter.

FIG. 4 shows an exemplary embodiment of a graph 400 of ultrasonic level-sensor readings as a function of a weight-scale measurement (or a mass-scale measurement) and a comparison with an adaptive, neuro-fuzzy interface system (ANFIS) non-linear regression expectation in accordance with the disclosed subject matter. ANFIS data are indicated by an algorithm training curve 401 while actual measurement data gleaned from, for example, the in-situ, closed-loop bubble and foam detection and reduction system 300 of FIG. 3, are shown as individual dots 403. An exemplary embodiment of an ANFIS algorithm is described in more detail below. Briefly however, the ANFIS algorithm can be established through a comparison of training data (e.g., empirical data collected from a given tool over a range of operating conditions). Once the data are classified and correlated with the ANFIS algorithm, the ANFIS algorithm provides an artificial intelligence system that may be used to anticipate or predict when bubbles and/or foam may need to be reduced or eliminated by the foam-reduction showerhead 311 of FIG. 3. The ANFIS algorithm may be stored in, for example, the processor 309.

With reference again to FIG. 3, as well as continuing reference to FIG. 4, a portion of the graph 400 indicates an area 411 in the ultrasonic-level sensor reading in which an increasing level increases more quickly when liquid in the fluid reservoir 301 comes in contact with the drain tube 307 and any tubing stretch that may occur makes a measured mass of the fluid 303 increase more slowly than would otherwise be expected. In contrast, a portion of the graph 400 indicates an area 409 in in the ultrasonic-level sensor reading in which the level increases more slowly than expected when liquid is filling both the fluid reservoir 301 and much or all of the tubing coupled thereto. An area of the curve between the area 409 and the area 411 is more linear in nature.

An arrow 407 indicates that future sensor-fusion measurement data on the left side of the algorithm training curve 401 is related to an increasing volume of bubbles and/or foam being detected. An arrow 405 indicates that the algorithm training curve 401 can be expected to shift to the right when turning on the pump 313 (see FIG. 3) due to an additional force of moving the fluid stream from the drain tube 307.

Figure 5:
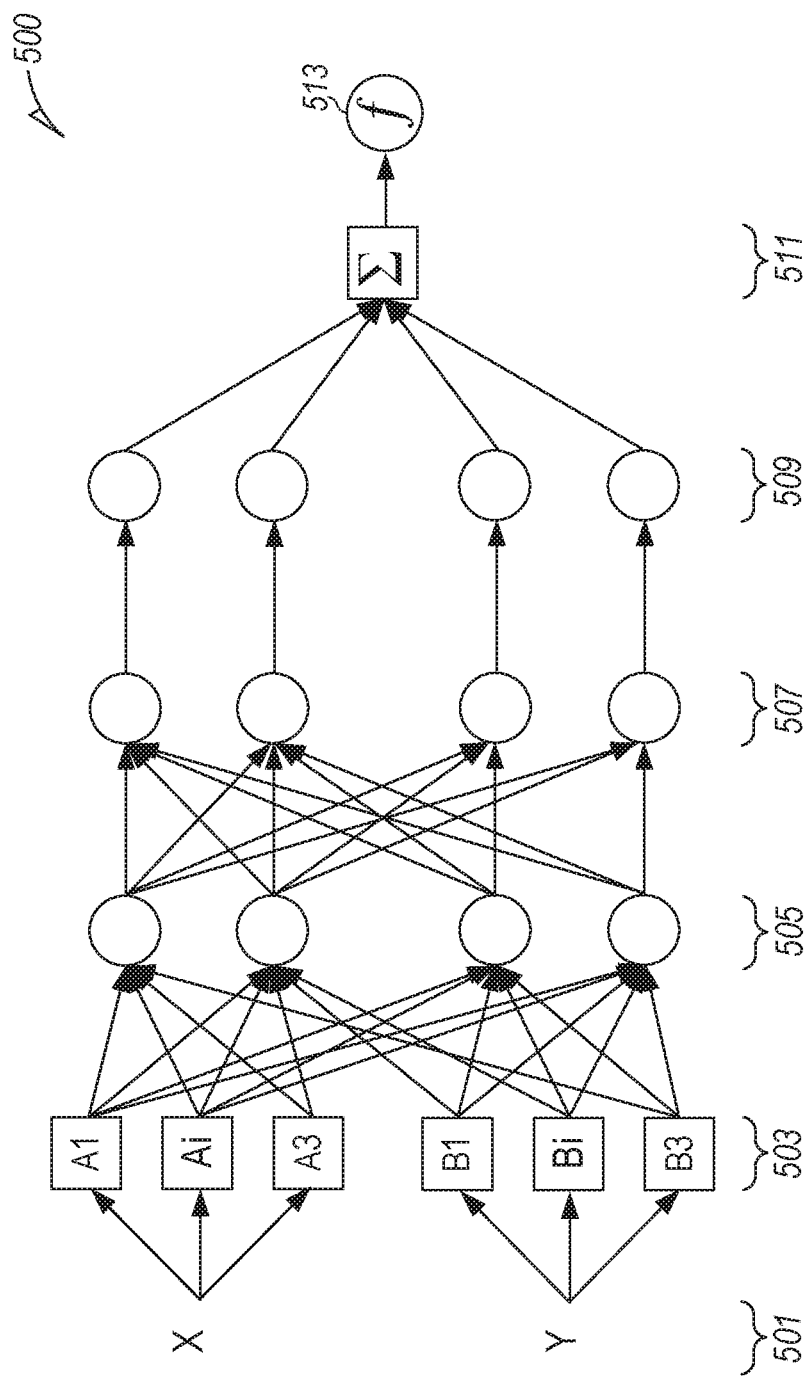
FIG. 5 shows an exemplary embodiment of an ANFIS architecture to produce, for example, the ANFIS non-linear regression expectation of FIG. 4, in accordance with the disclosed subject matter.

FIG. 5 shows a high-level exemplary embodiment of an ANFIS architecture 500 to produce, for example, the ANFIS non-linear regression expectation of FIG. 4, in accordance with the disclosed subject matter. An effective artificial-intelligence-based prediction model incorporates hybrid learning (the adaptive, neuro-fuzzy interface system (ANFIS)) approach for training, for example, the exemplary embodiment of the in-situ, closed-loop bubble and foam detection and reduction system 300 of FIG. 3. The model is capable of using actual measurement data that could be much more complicated than the simplified version of measurement data presented in FIG. 4. Further, an expected prediction accuracy (in terms of root-mean-square-error (RMSE)) of ANFIS, on average, is 10 times better than various types of polynomial-based nonlinear regression models. Consequently, for a similar level of accuracy, the ANFIS model has an improved speed, fault tolerance level, and adaptiveness than using an artificial neural-network (ANN) model alone.

Referring again to the high-level exemplary ANFIS architecture 500 of FIG. 5, a first layer 501 shows two inputs (only two inputs are shown for simplicity). Each of the two inputs has three membership functions, indicated by the second layer 503. The membership function formulas are generated in the second layer 503 and may include, for example, triangular fits and related formulas (e.g., a linear-fit type); trapezoidal fits and related formulas (e.g., a linear-fit type); gaussian fits and related formulas (e.g., a nonlinear-fit type); generalized-bell fits and related formulas (e.g., a nonlinear-fit type); and sigmoidal ("S-shaped") fits and related formulas (e.g., a nonlinear-fit type)).

A third layer 505 of the high-level exemplary ANFIS architecture 500 in which outputs of the previous layer (the second layer 503) are multiplied by an "AND" operator to determine a degree to which an antecedent portion of a fuzzy rule is satisfied. A fourth layer 507 calculates a weighting of the previously determined degree to which an antecedent portion of a fuzzy rule is satisfied. A fifth layer 509 determines a contribution of each of the aforementioned rules in determining an output of the model. A single node in a sixth layer 511 provides an output node that determines an overall output by summing all incoming signals from the fifth layer 509. A final output function is available to the model at a seventh layer 513.

In general, an adaptive network, a hybrid-learning algorithm, which is a combination of a gradient method and a least-square-estimation (LES) method, known in the relevant art to identify relevant parameters, is applied to the high-level exemplary ANFIS architecture 500. Actual measurement data, for example, as shown by the individual dots 403 of FIG. 4, can be divided into various groups to train and verify the ANFIS model. Verification of the ANFIS model can be accomplished by comparing the modeled and anticipated data with actual data to evaluate performance of the ANFIS model.

Therefore, various embodiments of the disclosed subject matter include an inexpensive in-situ sensor-fusion solution to combine at least one liquid-level sensor (e.g., an ultrasonic level-sensor) and a mass-detection device that can effectively prevent a falsely-triggered overflow-alarm caused by bubbles and/or foam, as well as by or in combination with a noisy level-sensor. As noted above, the bubbles and foam are formed by trapping air in the liquid. Therefore, the bubbles or foam only increases an overall level of detected volume of the liquid without significantly affecting the mass of the liquid. Consequently, the bubbles and foam can be detected in substantially real-time if subsequently measured data fall above a pre-determined level that is substantially bubble and foam-free versus a mass curve. Additionally, a showerhead device can be added to the system and activated and deactivated to reduce or eliminate bubbles and foam (e.g., a bubble/foam reducer). The showerhead is configured to spray the same liquid (e.g., a liquid-based, chemical plating-solution) from above and into a liquid reservoir until all or substantially all of the bubbles and foam are removed or reduced in volume.

Further, when noise is coupled into an ultrasonic level-sensor, the mass of the liquid will stay substantially the same despite the noise spikes being induced into the level sensor. Therefore, when an overflow alarm is potentially triggered, the system employing one or more of the embodiments disclosed above will recognize that the overflow alarm is a false alarm and prevent dumping the liquid used in a given process.

Therefore, based on the various embodiments disclosed herein, the disclosed subject matter provides an inexpensive and effective in-situ sensor-fusion solution empowered by artificial intelligence. The disclosed subject matter can improve the mean-time-to-reset (MTTR), mean-time-between-failure (MTBF), mean-time-to-failure (MTTF), as well as various other types of performance metrics of semiconductor processing-tools and tools of related industries. Further, at least aspects of the disclosed subject matter have a wide application potential to other industries, including flat-panel display fabrication and processing, thin-film head fabrication and processing, and various types of plating operations in producing decorative objects (e.g., jewelry); corrosion inhibition, reduction of friction, tool-hardening operations, infrared (IR) reflectivity, gas and oil field operations and related holding and processing tanks, and a variety of other industries known to a person of ordinary skill in the art.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various embodiments, one or more computer systems (e.g., a standalone computer-system, a client computer-system, or a server computer-system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware-module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

Overall, the disclosed subject matter contained herein describes or relates generally to operations of tools in a semiconductor fabrication environment (fabrication). Such tools can include various types of tools having one or more types of processing or cooling liquids used therein. However, as noted above, the disclosed subject matter is not limited to semiconductor environments and can be used in a number of machine-tool environments such as manufacturing and machining environments, as well as a variety of other environments. Upon reading and understanding the disclosure provided herein, a person of ordinary skill in the art will recognize that various embodiments of the disclosed subject matter may be used with other types of process tools as well as a wide variety of other tools, equipment, and components.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various configurations.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Further, functionally equivalent methods and devices within the scope of the disclosure, in addition to those enumerated herein, will be apparent to the skilled artisan from the foregoing descriptions. Portions and features of some embodiments, materials, and construction techniques may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

Examples of the Disclosed Subject Matter

In a first example, the disclosed subject matter describes a system including a liquid-level sensor for determining a level of a liquid in a fluid reservoir and a mass-detection device for determining a mass of the fluid reservoir and liquid contained therein. A processor, electrically coupled to the liquid-level sensor and the mass-detection device, determines a measured volume of liquid as determined by the level of the liquid. The processor also determines an actual volume of the liquid within the fluid reservoir based on a mass of the liquid contained within the fluid reservoir. A showerhead is coupled to the processor and positioned above the fluid reservoir. The showerhead is activated by the processor when the measured volume of liquid determined by the liquid-level sensor exceeds the actual volume of the liquid as determined by the mass-detection device by a predetermined amount. A combination of the liquid-level sensor, the mass-detection device, the processor, and the showerhead thereby comprises an in-situ, closed-loop bubble and foam detection and reduction system.

A second example includes the system of the first example, and further includes a pump fluidly coupled to the showerhead to provide an additional volume of the fluid into the fluid reservoir to reduce a volume of at least one of bubbles and foam.

A third example includes the example of system of the second example, and further includes coupling the pump to the showerhead with flexible tubing to reduce errors in mass measurements by the mass-detection device.

A fourth example includes any one of the preceding examples, in which the system is further arranged to determine the actual volume of the liquid within the fluid reservoir based on a known density of the liquid within the fluid reservoir and a mass of the fluid reservoir when empty.

A fifth example includes the system of the fourth example, in which the processor is further arranged to compare a calculated volume of the fluid within the fluid reservoir based on the known density of the fluid and the mass of the fluid reservoir when empty, and compare the calculated volume of the fluid to the volume of the fluid as determined from the level of the liquid in the fluid reservoir as measured by the liquid-level sensor.

A sixth example includes the system of the fifth example, in which the processor is further arranged to generate and transmit a signal to a pump to provide an additional volume of the fluid into the fluid reservoir through the showerhead based on a determination that the calculated volume of the liquid is greater that the volume of the fluid as determined from the level of the liquid by a predetermined amount.

In a seventh example, the disclosed subject matter describes a system including a liquid-level sensor for determining a level of a liquid in a fluid reservoir and a mass-detection device for determining a mass of the fluid reservoir and liquid contained within the fluid reservoir. A combination of the liquid-level sensor, the mass-detection device, and the processor thereby comprising an in-situ, closed-loop bubble and foam detection system.

An eight example includes the system of the seventh example, and further includes a showerhead positioned above the fluid reservoir and a pump fluidly coupled to the showerhead and electrically coupled to the processor. The pump is activated by the processor to supply the liquid to the showerhead when an anticipated volume of liquid exceeds the actual volume of the liquid by a predetermined amount.

A ninth example includes the system of the seventh example, and further includes a showerhead positioned above the fluid reservoir and a pump fluidly coupled to the showerhead and electrically coupled to the processor. The pump is activated by the processor to supply the liquid to the showerhead when at least one volume indicator including a measured volume of liquid determined by the liquid-level sensor exceeds the actual volume of the liquid by a predetermined amount and an anticipated volume of liquid exceeds the actual volume of the liquid by a predetermined amount.

A tenth example includes the system of any one of the preceding seventh example through the ninth example, with the processor being arranged to apply a predetermined weighting value to the actual calculated volume and the anticipated volume to trigger activation of the showerhead by supplying the liquid through the pump.

An eleventh example includes the system of any one of the preceding seventh example through the tenth example, with the processor being arranged to determine a measured volume of liquid as determined by the level of the liquid, and determine an actual volume of the liquid within the fluid reservoir based on a mass of the liquid contained within the fluid reservoir.

A twelfth example includes the system of any one of the preceding seventh example through the eleventh example, and further includes a showerhead positioned above the fluid reservoir, and a pump fluidly coupled to the showerhead and electrically coupled to the processor, the pump is activated by the processor to supply the liquid to the showerhead to reduce an amount of at least one of bubbles and foam in the fluid reservoir.

A thirteenth example includes the system of the twelfth example, and further includes coupling the pump to the showerhead with flexible tubing to reduce errors in mass measurements by the mass-detection device.

A fourteenth example includes the system of any one of the preceding seventh example through the thirteenth example, where the processor is further arranged to determine the actual volume of the liquid within the fluid reservoir based on a known density of the liquid within the fluid reservoir and a mass of the fluid reservoir when empty.

In a fifteenth example, the disclosed subject matter describes a system including a liquid-level sensor for determining a level of a liquid in a fluid reservoir and a mass-detection device for determining a mass of the fluid reservoir and liquid contained therein. A processor, electrically coupled to the liquid-level sensor and the mass-detection device, is used to determine an actual volume of the liquid within the fluid reservoir based on a mass of the liquid contained within the fluid reservoir. The processor also determines an anticipated volume of the liquid within the fluid reservoir based on a determined, non-linear regression expectation of volume. A combination of the liquid-level sensor, the mass-detection device, and the processor thereby comprising an in-situ, closed-loop bubble and foam detection system.

A sixteenth example includes the system of the fifteenth example, where the determined, non-linear regression expectation is based on an adaptive, neuro-fuzzy interface system (ANFIS) analysis.

A seventeenth example includes the system of either of the preceding fifteenth example and the sixteenth example, and further includes a showerhead positioned above the fluid reservoir to dispense the fluid into the reservoir. A pump is fluidly coupled to the showerhead and electrically coupled to the processor. The pump is activated by the processor to supply the liquid to the showerhead to reduce an amount of at least one of bubbles and foam in the fluid reservoir.

An eighteenth example includes the system of the seventeenth example, where the pump is coupled to the showerhead with flexible tubing to reduce errors in mass measurements by the mass-detection device.

A nineteenth example includes the system of any one of the preceding fifteenth example through the eighteenth example, where the processor is further arranged to determine the actual volume of the liquid within the fluid reservoir based on a known density of the liquid within the fluid reservoir and a mass of the fluid reservoir when empty.

A twentieth example includes the system of any one of the preceding fifteenth example through the nineteenth example, where the processor generates and transmits a signal to a pump to provide an additional volume of the fluid into the fluid reservoir through a showerhead positioned above the fluid reservoir based on a determination that the calculated volume of the liquid is greater that the volume of the fluid as determined from the level of the liquid by a predetermined amount.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A system, comprising:
    a liquid-level sensor configured to determine a level of a liquid in a fluid reservoir;
    a mass-detection device configured to determine a mass of the fluid reservoir and liquid contained therein;
    a processor electrically coupled to the liquid-level sensor and the mass-detection device to determine a measured volume of liquid as determined by the level of the liquid, the processor further to determine an actual volume of the liquid within the fluid reservoir based on a mass of the liquid contained within the fluid reservoir; and
    a showerhead coupled to the processor and positioned above the fluid reservoir, the showerhead to be activated by the processor when the measured volume of liquid determined by the liquid-level sensor exceeds the actual volume of the liquid as determined by the mass-detection device by a predetermined amount, a combination of the liquid-level sensor, the mass-detection device, the processor, and the showerhead thereby comprising an in-situ, closed-loop bubble and foam detection and reduction system.

2. The system of claim 1, further comprising a pump fluidly coupled to the showerhead to provide an additional volume of the fluid into the fluid reservoir to reduce a volume of at least one of bubbles and foam.

3. The system of claim 2, further comprising coupling the pump to the showerhead with flexible tubing to reduce errors in mass measurements by the mass-detection device.

4. The system of claim 1, wherein the processor is further configured to determine the actual volume of the liquid within the fluid reservoir based on a known density of the liquid within the fluid reservoir and a mass of the fluid reservoir when empty.

5. The of claim 4, wherein the processor is further configured to:
compare a calculated volume of the fluid within the fluid reservoir based on the known density of the fluid and the mass of the fluid reservoir when empty; and
compare the calculated volume of the fluid to the volume of the fluid as determined from the level of the liquid in the fluid reservoir as measured by the liquid-level sensor.

6. The system of claim 5, wherein the processor is further configured to generate and transmit a signal to a pump to provide an additional volume of the fluid into the fluid reservoir through the showerhead based on a determination that the calculated volume of the liquid is greater that the volume of the fluid as determined from the level of the liquid by a predetermined amount.

7. A system, comprising:
a liquid-level sensor configured to determine a volume of a liquid in a fluid reservoir;
a mass-detection device configured to determine a mass of the fluid reservoir and liquid contained therein; and
a processor electrically coupled to the liquid-level sensor and the mass-detection device to determine an actual volume of the liquid within the fluid reservoir, a combination of the liquid-level sensor, the mass-detection device, and the processor thereby comprising an in-situ, closed-loop bubble and foam detection system.

8. The system of claim 7, further comprising:
a showerhead positioned above the fluid reservoir; and
a pump fluidly coupled to the showerhead and electrically coupled to the processor, the pump to be activated by the processor to supply the liquid to the showerhead when an anticipated volume of liquid exceeds the actual volume of the liquid by a predetermined amount.

9. The system of claim 7, further comprising:
a showerhead positioned above the fluid reservoir; and
a pump fluidly coupled to the showerhead and electrically coupled to the processor, the pump to be activated by the processor to supply the liquid to the showerhead when at least one volume indicator including a measured volume of liquid determined by the liquid-level sensor exceeds the actual volume of the liquid by a predetermined amount and, an anticipated volume of liquid exceeds the actual volume of the liquid by a predetermined amount.

10. The system of claim 9, wherein the processor is configured to apply a predetermined weighting value to the actual calculated volume and the anticipated volume to trigger activation of the showerhead by supplying the liquid through the pump.

11. The system of claim 7, wherein the processor is further configured to:
determine a measured volume of liquid as determined by the level of the liquid; and
determine an actual volume of the liquid within the fluid reservoir based on a mass of the liquid contained within the fluid reservoir.

12. The system of claim 7, further comprising:
a showerhead positioned above the fluid reservoir; and
a pump fluidly coupled to the showerhead and electrically coupled to the processor, the pump to be activated by the processor to supply the liquid to the showerhead to reduce an amount of at least one of bubbles and foam in the fluid reservoir.

13. The system of claim 12, further comprising coupling the pump to the showerhead with flexible tubing to reduce errors in mass measurements by the mass-detection device.

14. The system of claim 7, wherein the processor is further configured to determine the actual volume of the liquid within the fluid reservoir based on a known density of the liquid within the fluid reservoir and a mass of the fluid reservoir when empty.

15. A system, comprising:
a liquid-level sensor configured to be coupled to a fluid reservoir to determine a level of a liquid in the fluid reservoir;
a mass-detection device configured to be coupled to the fluid reservoir, the mass-detection device further configured to determine a mass of the fluid reservoir and the liquid contained therein; and
a processor to electrically couple to the liquid-level sensor and the mass-detection device to determine an actual volume of the liquid within the fluid reservoir based on a mass of the liquid contained within the fluid reservoir, the processor further to determine an anticipated volume of the liquid within the fluid reservoir based on a determined, non-linear regression expectation of volume, a combination of the liquid-level sensor, the mass-detection device, and the processor thereby comprising an in-situ, closed-loop bubble and foam detection system.

16. The system of claim 15, wherein the determined, non-linear regression expectation is based on an adaptive, neuro-fuzzy interface system (ANFIS) analysis.

17. The system of claim 15, further comprising:
a showerhead configured to be positioned above the fluid reservoir to dispense the fluid into the reservoir; and
a pump fluidly coupled to the showerhead and electrically coupled to the processor, the pump to be activated by the processor to supply the liquid to the showerhead to reduce an amount of at least one of bubbles and foam in the fluid reservoir.

18. The system of claim 17, wherein the pump is configured to be coupled to the showerhead with flexible tubing to reduce errors in mass measurements by the mass-detection device.

19. The system of claim 15, wherein the processor is further configured to determine the actual volume of the liquid within the fluid reservoir based on a known density of the liquid within the fluid reservoir and a mass of the fluid reservoir when empty.

20. The system of claim 15, wherein the processor is further configured to generate and transmit a signal to a pump to provide an additional volume of the fluid into the fluid reservoir through a showerhead that is configured to be positioned above the fluid reservoir based on a determination that the calculated volume of the liquid is greater that the volume of the fluid as determined from the level of the liquid by a predetermined amount.

\* \* \* \* \*